US005168693A

United States Patent [19]

Ingvardsen

[11] Patent Number: 5,168,693

[45] Date of Patent: Dec. 8, 1992

[54] COUPLING MEANS FOR A GARDENING TOOL

[75] Inventor: Soren Ingvardsen, Silkeborg, Denmark

[73] Assignee: Fiskars Zinck-Lysbro/A/S, Silkeborg, Denmark

[21] Appl. No.: 663,317

[22] Filed: Mar. 1, 1991

[30] Foreign Application Priority Data

Mar. 1, 1990 [DK] Denmark ............................ 0529/90

[51] Int. Cl.[5] ........................................ A01D 11/00

[52] U.S. Cl. ............................ 56/400.04; 56/400.19; 56/DIG. 18; 403/289; 403/314

[58] Field of Search ........... 56/400.04, 400.05, 400.11, 56/400.12, 400.16, 400.17, 400.18, 400.19, 400.01, DIG. 9, DIG. 18; 403/289, 409.1, 300, 314, 361

[56] References Cited

U.S. PATENT DOCUMENTS 2,821,834 2/1958 Walker ............................ 56/400.19
2,941,827 6/1960 Parsons ............................ 403/289
3,701,243 10/1972 Durkee ..................... 56/DIG. 18 X
3,719,378 3/1973 Windsor ............................ 403/289
4,068,346 1/1978 Binder ......................... 56/400.18 X
4,514,970 5/1985 Wilson ............................ 56/400.12
4,843,667 7/1989 Hanly, Sr. .................... 56/400.19 X
4,848,073 7/1989 Germain et al. ............ 56/400.21 X

FOREIGN PATENT DOCUMENTS 3246887 8/1983 Fed. Rep. of Germany .
3519544 12/1986 Fed. Rep. of Germany .

*Primary Examiner*—Terry Lee Melius
*Attorney, Agent, or Firm*—Lee, Mann, Smith, McWilliams, Sweeney & Ohlson

[57] ABSTRACT

The coupling means according to the invention consists of an insertion member and a receiving member, as the arms of the insertion member by coupling engage a sliding bolt, which is loaded by a leaf spring against a locking position. The leaf spring is angular bent, and has one short leg resting in a slit facing the inside of a tube member, making up the outer part of the receiving member. By mounting the spring in this way, the long leg of the spring is stretching between the tube member and an insert, and fixation of the spring is obtained without use of additional means.

1 Claim, 4 Drawing Sheets

COUPLING MEANS FOR A GARDENING TOOL

BACKGROUND OF THE INVENTION

The invention relates to a coupling means for connecting a handle part and a tool part of a gardening tool. The coupling means comprises an insertion member and a receiving member, each fastened to or integrated with either the handle part or the tool part.

Coupling means of this kind are disclosed in DE patent publications no. 35 19 544 (Rux) and 32 46 887 (Wolf-Geräte).

The Rux patent shows a coupling means wherein the receiving member comprises a tube piece in which an insert with a manually slidable locking means that is biased against its locked position with a spring. In the locked position the locking means engages the insertion member. The disclosed coupling means to imply the assembling of a large number of single parts.

The Wolf-Geräte patent discloses a coupling means having the same basic features as indicated above in connection with the Rux patent, with the addition that the spring is a leaf spring secured in one end in a recess in the insert facing the the tube piece, while a part af the spring close to the other free end has a bending for engaging a retaining part of the insertion member. The said bending is formed with an inclination related to the insertion movement of the retaining part, allowing deflection of the spring during insertion, whereas the opposite side of the bending has a face normal to the withdrawal movement of the retaining part. A slidable and manually activated push-button is provided in the insert for releasing the retaining part of the insertion member as the button pushes the free end of the spring away from its locking position.

SUMMARY OF THE INVENTION

An object of the present invention is to provide a coupling means for a gardening tool that implies a secure fastening of the tool and the handle while at the same time an easy release of the tool may be attained.

Another object of the invention is to provide a coupling means implying assembling of fewer parts in the making process.

Still another object of the invention is to provide a coupling means with more simple spring means.

A further object of the present invention is to provide a coupling means of lesser total length.

According to the invention these and other objects are attained by a coupling means for a gardening tool comprising a handle part and a tool part to be connected by the coupling means, which comprises an insertion member and a receiving member, the insertion member comprising two mutually parallel arms protruding from the insertion member, the said arms each having a retaining surface near the free end of the arm and facing away from the said end, the said surfaces being placed at mutually facing sides of the arms, and wherein the receiving member comprises a tube piece provided with an insert having a sliding member that is slidable in a direction mainly perpendicular to the symmetry axis of the tube piece and which sliding member is biased against a first position with a cantilever spring, wherein the insert has at least one aperture extending from a first end of the insert to the position of and surrounding the sliding member on at least three sides, the spring being placed in a recess on the outer part of the insert and extending along the symmetry axis of the tube piece, wherein a first end of the spring rests in a radial slit in the insert and a second end of the spring bears against the sliding member, the sliding member comprising a central web provided with a step surface on each side, each surface having an inclination to the direction of movement of the slide member and facing the mouth of the said aperture, whereas on the sliding member and in conjunction with said step surfaces there is provided backstop surfaces facing away from said mouth, which backstop surfaces being arranged as to engage the said retaining surfaces in the said first position of the sliding member.

BRIEF DESCRIPTION OF THE DRAWINGS

A preferred embodiment of the invention will be described in the following with reference to the drawings, where.

DESCRIPTION OF A PREFERRED EMBODIMENT

Figure 1:
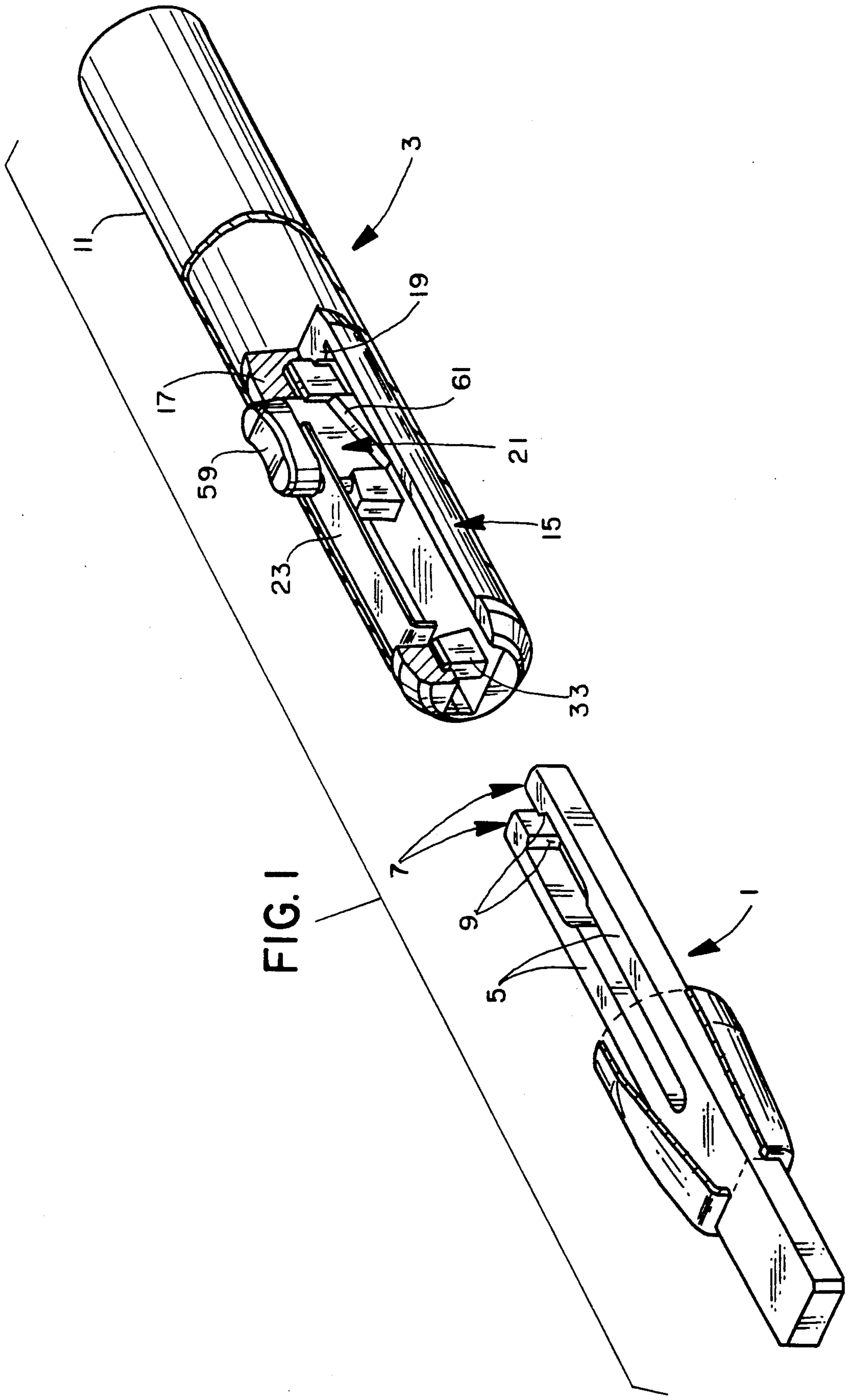
FIG. 1 is a perspective view of the coupling means of the present invention as illustrated in its separated state.
Figure 3:
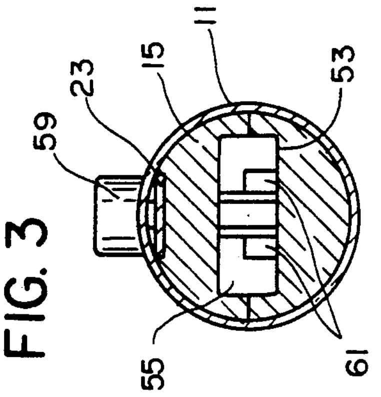
FIG. 3 is a view on the line III—III of FIG. 2.

A preferred embodiment of a coupling means according to the invention consists of an insertion member 1 adapted for insertion into a receiving member 3, wherein the insertion member 1 and the receiving member 3 are mounted on a garden tool and a handle, respectively. Obviously, the said members can be mounted in the reverse order.

The insertion member 1 comprises two parallel arms 5, as illustrated, of almost hook-like shape near their free ends 7, to the effect that the ends 7 have surfaces 9, facing the opposite direction in relation to the direction of insertion. The arms 5 should be comparatively stiff, for example made of steel.

The receiving member 3 comprises a pipe member 11 provided with a lateral hole 13 and an insert 15, which can be separated into an upper half part 17, a lower half part 19, a manually operated sliding bolt 21 and a leaf spring 23. The terms "lower" and "upper" are of relative importance only, since the half parts 17 and 19 may have different positions in relation to one another, depending upon the way the coupling means were initially mounted.

The upper half part 17 is provided with slit 25 extending crosswise in relation to the longitudinal direction of the half part 17 and ending at the surface, in connection with which the pipe member 11 is positioned. The slit 25 is preferably at right angles to the longitudinal direction of the half part and is located at a semicircular shoulder 27, which works as a backstop to the pipe member 11, as the receiving member 3 is assembled. In connection with the opening of said slit there is provided a seat 28 adapated to the spring 23, said seat being formed with an inclination in relation to the surface of the half part 17. The seat 28 abuts on a through opening 29. The bottom of the half part 17 has a central, longitudinal recess 31 adapted to receive guide pins 33, 35, projecting from the lower half part 19.

In addition to the pins 33 and 35, the lower half part 19 has a third pin 37, which is adapted to, in cooperation with the pin 35, to guide the sliding bolt 21, the pins 35 and 37 having grooves 39 and 41, which are adapted to receive corresponding projections 43 and 45 provided on the sliding bolt 21. The pins 33, 35 and 37 are so narrow that they can be passed on both sides by the arms 5. Like the upper half part 17, the lower half part 19 has a semicircular shoulder 47. Flush with the outline of the shoulder 47 there is provided a guide projection 49 adapted to fit into a corresponding recess, which is not illustrated, of the pipe member 11. Furthermore, the half part 19 has a groove 51 serving the purpose of pushing down therein a flap, which is not illustrated, of the side of the pipe member 11, to ensure that the insert 15 is not pulled out of the pipe member 11 during operation.

The parts 17 and 19 have tracks 53 and 55 facing one another on either side of the pins 33, 35 and 37, said tracks continuing outwards to the outside of the half parts 17, 19 at the shoulders 27, 47. As the insert 15 is assembled, two deep holes corresponding to the cross sections and the length of the arms 5 will result.

The sliding bolt 21 comprises a body 57 of comparatively small thickness and is provided at one end with a bottom 59 for manual activation. At its other end the body 57 has two step surfaces 61 on both sides, which are so positioned that they 61 form an acute angle in relation to the tracks 55, after the insert 15 has been assembled. The rear sides of the step surfaces 61 have faces of contact 63 for the surfaces 9. The faces of contact 63 fit into corresponding tracks 65 provided in an opening 67 of the lower half part 19. At the same time the tracks 63 and the faces of the contact 65 will ensure that the sliding bolt 21 can be positioned into the insert 15 in one way only to the effect that the step surfaces 61 will always face the right direction.

The leaf spring 23 is bent into an approximately right angle near one end to the effect that a short leg 69 is formed, adpated to be inserted into the slit 25. The long legs 71 of the spring 23 are provided with a slit 73 having a width which will permit the body 57 of the sliding bolt to be accomodated in the slit 73.

Figure 4:
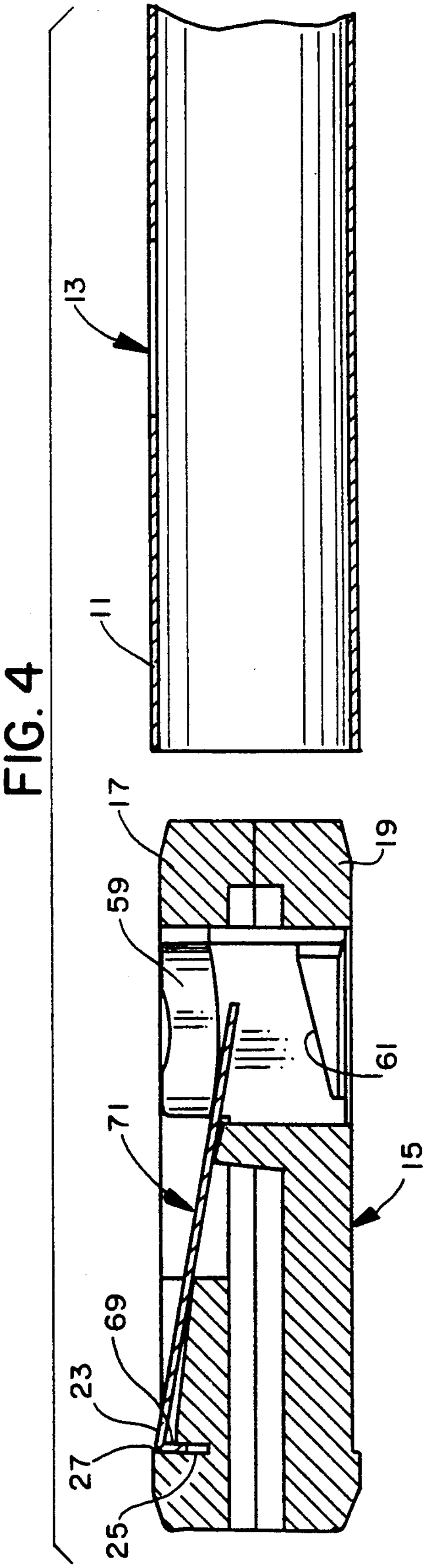
FIG. 4 illustrates the receiving member separated into pipe member and insert immediately before assembly.
Figure 5:
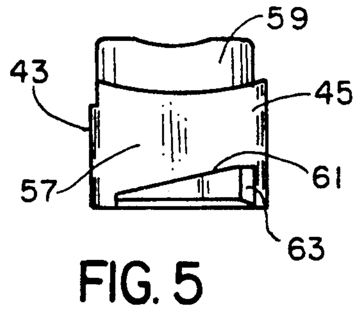
FIGS. 5 and 6 illustrate the sliding bolt as seen from two different sides.
Figure 6:
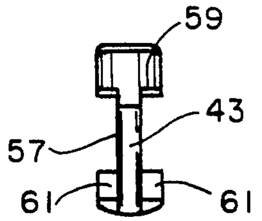
Figure 7:
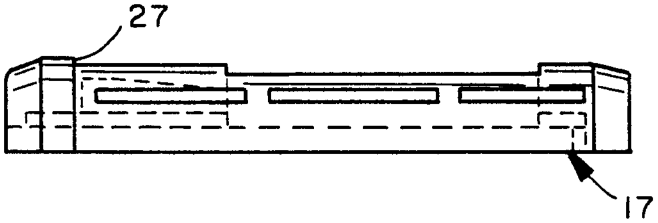
FIGS. 7, 8 and 9 illustrates the upper half part of the insert as seen from the side, from the top and from the bottom.
Figure 8:
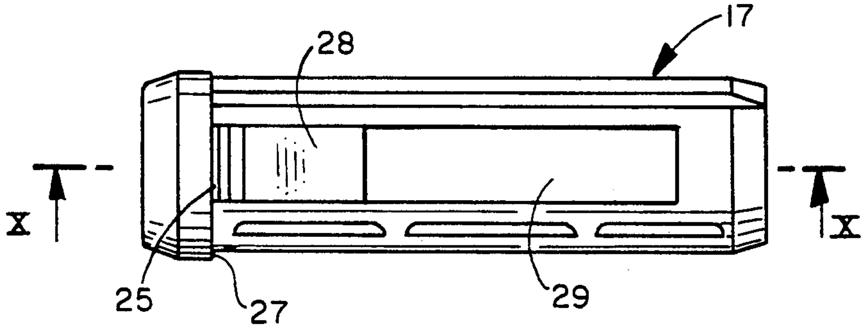
Figure 9:
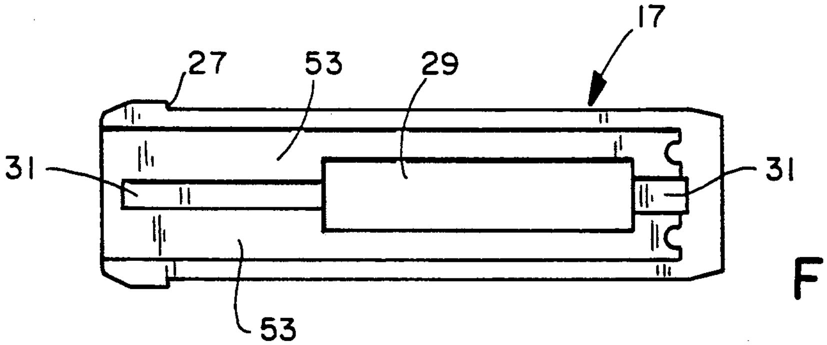
Figure 10:
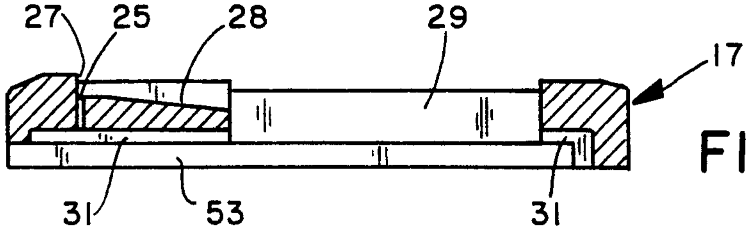
FIG. 10 is a section on the line X—X of FIG. 8.
Figure 11:
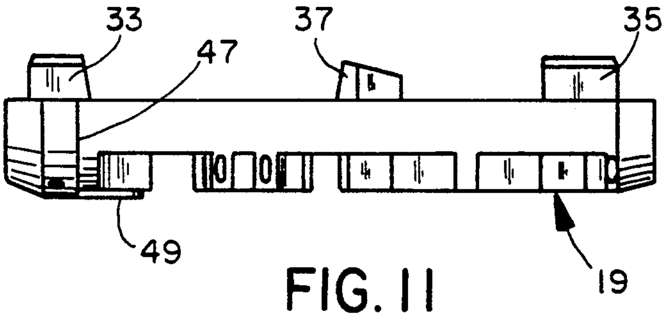
FIGS. 11 and 12 illustrate the lower half part of the insert as seen from the side and from the bottom, respectively.
Figure 12:
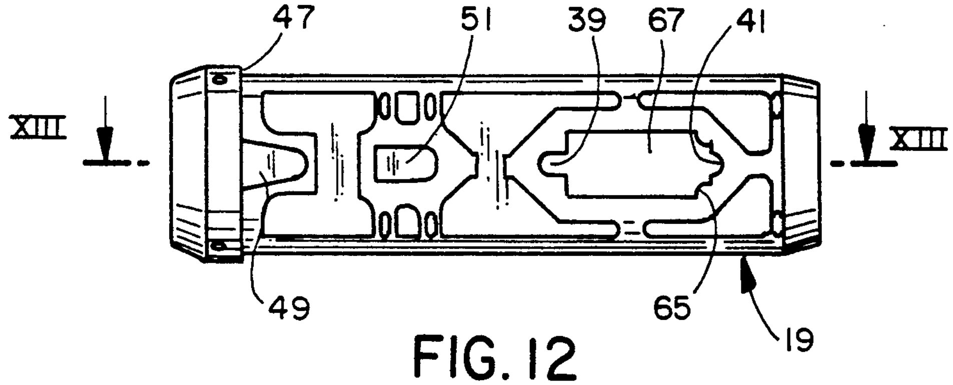
Figure 13:
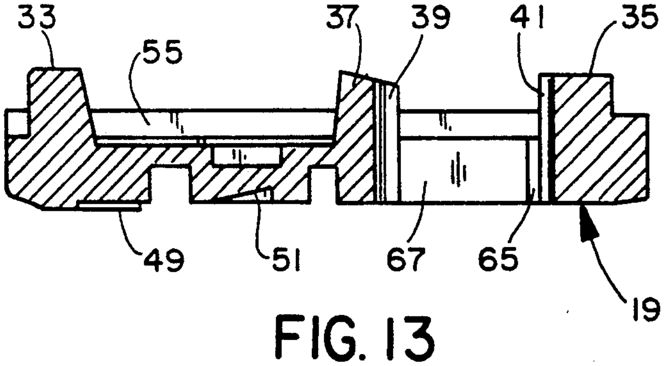
FIG. 13 illustrates a section on the line XIII—XIII of FIG. 12.
Figure 14:
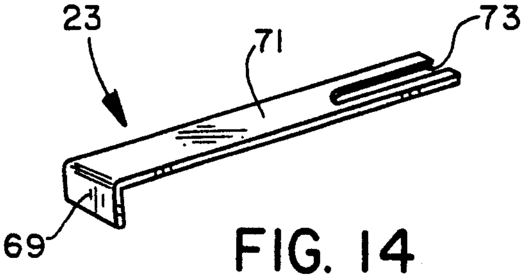
FIG. 14 is a perspective view of a leaf spring.

The components 17, 19 and 21 are preferably made of injection moulded, fibre-reinforced plastic, whereas the spring 23 is made of spring steel. The insert 15 may be assembled manually or by machine from a total of 4 parts, whereby the parts 17 and 19 are assembled, the sliding bolt 21 is put into place through the opening 19, and the spring 19 is positioned, as illustrated in FIG. 4, with the sides surrounding the slit around the body 57 and with the short leg 69 at an angle in relation to the slit 25.

Figure 2:
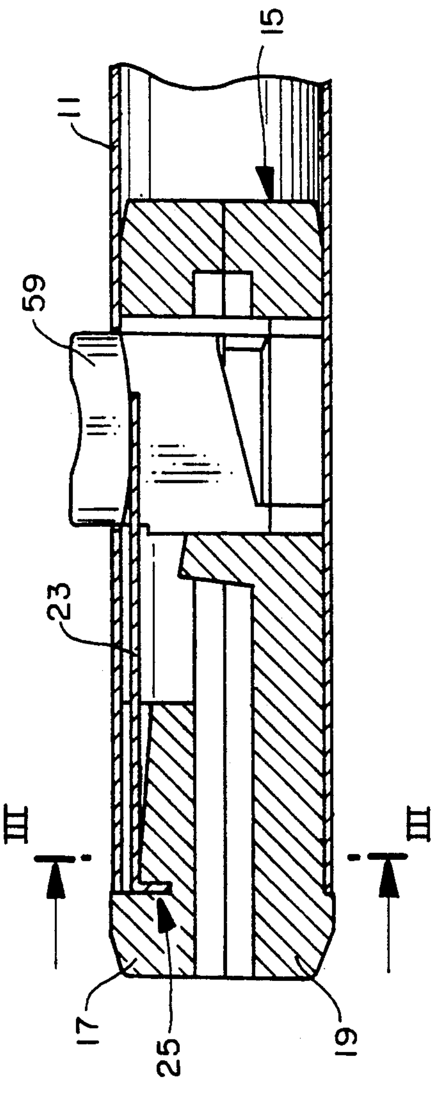
FIG. 2 is a sectional side view of the receiving member.

The pipe member 11 is then slid over the insert 15, and at the same time the sliding bolt 21 is pushed down against the effect of the spring 23, until the upper side of the botton 59 is flush with the outside of the insert 15. As the pipe member 11 hits the spring 23, the short leg 69 is pushed down into its final position inside the slit 25, and at the same time the botton 59 can return to its normal position, wherein it 59 will project through the hole of the pipe member 11, as shown in FIG. 2.

The coupling means works as follows. The arms 5 of the insert member 1 are simply inserted into the holes 3 of the receiving member, whereby the arms 5 will hit the step surfaces 61 pulling down the sliding bolt 21 until the surfaces 9 of the arms have passed the step surfaces 61. The spring 23 will then ensure that the sliding bolt 21 is taken back to into initial position, wherein the engagement of the faces of contact 63 with the surfaces 9 will prevent the insert member 1 from being pulled out of the receiving member 3. The coupling means is then released simply by pushing down the sliding bolt 21 until the insertion member 1 is disengaged.

It will be apparent to those skilled in the art that a variety of alternative embodiments in within the frames of the appended claim. It is conceivable for example, to have the insert piece consist of three parts only

I claim:

1. A coupling means for a gardening tool comprising a handle part and a tool part to be connected by the coupling means, which comprises an insertion member and a receiving member, the insertion member comprising two mutally parallel arms protruding from the insertion member, the said arms each having a retaining surface near the free end of the arm and facing away from the said free end, the said surfaces being placed at mutually facing sides of the arms, and wherein the receiving member comprises a tube piece provided with an insert having a sliding member that is slidable in a direction mainly perpendicular to the symmetry axis of the tube piece, which sliding member is biased against a first position with a cantilever spring, wherein the insert has at least one aperture extending from a first end of the insert to the position of and surrounding the sliding member on at least three sides, the spring being placed in a recess on a part of the insert facing the inner side of the tube piece and extending along the symmetry axis of the tube piece, wherein a first end of the spring rests in a radial slit in the insert and a second end of the spring bears against the sliding member, the sliding member comprising a central web provided with a step surface on each side, each surface having an inclination to the direction of movement of the slide member and facing the mouth of the said aperture, whereas on the sliding member and in conjunction with said step surfaces there is provided backstop surfaces facing away from said mouth, which backstop surfaces being arranged as to engage the said retaining surfaces in the said first position of the sliding member.

* * * * *